United States Patent Office 3,404,100
Patented Oct. 1, 1968

3,404,100
METHANE PRODUCTION USING A
PROMOTED CATALYST
William F. Taylor, Scotch Plains, and John H. Sinfelt,
Berkeley Heights, N.J., assignors to Esso Research and
Engineering Company, a corporation of Delaware
No Drawing. Filed Oct. 21, 1963, Ser. No. 317,777
The portion of the term of the patent subsequent to
Dec. 1, 1984, has been disclaimed
3 Claims. (Cl. 252—462)

ABSTRACT OF THE DISCLOSURE

A lanthanide rare earth promoter is used in a coprecipitated Ni-$Al_2O_3$ catalyst which is especially useful for the production of methane rich gas by reacting hydrocarbons having 5 to 8 carbon atoms per molecule with steam at reaction temperatures in the range of 600 to 925° F.

---

This invention relates to the use of lanthanum, cerium, or a lanthanide rare earth mixture containing predominately lanthanum and cerium as a promoter for a nickel-alumina catalyst of high activity maintenance in the production of a fuel gas having a high methane content by reaction of hydrocarbons, preferably paraffins, having principally 5 to 8 carbon atoms per molecule with steam at low reaction temperatures in the range of 600° to 925° F.

The reaction of $C_5$ to $C_8$ paraffins in a naphtha feed with steam to form methane in the presence of a high activity catalyst at temperatures mainly below 925° F. is different from the reaction of lower hydrocarbons such as $C_1$ to $C_4$ paraffins to form hydrogen and carbon monoxide in what is known generally as a reforming process. In the reforming process the normally gaseous hydrocarbons are reacted with steam in the presence of a catalyst at temperatures substantially above 1000° F. Such a high-temperature reforming process is endothermic and is carried out in a reactor to which heat is supplied in addition to sensible heat carried by the reactants. The high-temperature reforming process degrades the thermal value of the normally gaseous hydrocarbon products in forming principally hydrogen and carbon monoxide in the high-temperature reforming process. The best catalysts have been indicated to be made by precipitating or depositing a nickel compound on a refractory oxide support material such as pumice, alumina, magnesia, clay, or the like, the support material being usually in a major proportion to the material deposited thereon. Such reforming catalysts have also been described as containing promoting compounds such as potassium oxide and various other difficultly reducible oxides. The catalyst used for the high-temperature reforming process is, in its preparation, subjected to elevated temperatures just as it is essentially exposed to heat at elevated temperaures when it is used at temperatures above 1000° F.

In accordance with the discoveries of the present invention, a high surface-area nickel-alumina catalyst containing a lanthanum, cerium, or lanthanum/cerium rich lanthanide rare earth mixture as a promoter free of contaminants which deactivate the catalyst has been found to have high activity and good activity maintenance in the reaction of $C_5$ to $C_8$ paraffins with steam at reaction temperatures in the range of 600° to 925° F. for producing a fuel gas rich in methane. This active catalyst is prepared by a coprecipitation technique using ammonium bicarbonate to coprecipitate hydroxides, carbonates, or basic carbonates of nickel and aluminum from an aqueous solution of nickel and aluminum nitrates under controlled temperatures of treatment, adding nitrate salt of the promoter to the precipitate separated from the solution, then drying and calcining in the presence of oxygen or air the precipitate having the admixed promoter salt at moderate elevated temperatures of 600° to 925° F. to obtain solid particles in which the oxides of nickel, aluminum and promoter are present in proper proportions and are free of contaminating substances. The calcined material may contain an atom ratio of nickel to aluminum ranging from 0.4 to 1.5 with the balance being a lanthanide or lanthanide earth oxide with an atom ratio of the lanthanide to nickel of .001 to 1.0. By lanthanide earth is meant rare earths which have atomic numbers in the range of 57 to 71. The compounds of nickel and aluminum which are precipitated may include the hydroxides, carbonates and basic carbonates of nickel and aluminum, and the precipitation is preferably effected in the aqueous salt solution heated to temperatures in the range of about 32° to 212° F. or to the boiling point of the solution as resulting slurry. Using the nitrates and the ammonium bicarbonate, no washing of the precipitate is required, and the final calcined metal oxides are satisfactorily free of contaminating agents because the nitrate, ammonium, carbonates, and hydroxides are decomposed. The resulting calcined particles containing the oxides of nickel, aluminum and lanthanide rare earth or earths are given a final activation by treatment with hydrogen at low temperatures of about 600° to 900° F. to reduce oxides of nickel present. This reduction treatment may be carried out after the catalyst is loaded into a reactor to eliminate difficulties of handling the reduced catalyst since the nickel readily picks up oxygen from the atmosphere even at low temperatures and thus becomes deactivated.

In the most important reaction of steam with vapors of low boiling normally liquid aliphatic hydrocarbons using a high activity nickel-alumina-lanthanide rare earth catalyst of the type herein described to produce a gas containing mainly methane, the hydrocarbon vapor and the steam are preheated to temperatures above 600° F. and to such a temperature as to maintain the desired reaction temperature, preferably in the range of 600° to 925° F. in the reaction zone and to which the hydrocarbon vapor and steam are passed for contact with a bed of the catalyst. The proportion of steam is in the range of 1.5 to 5 parts by weight per 1 part by weight of the hydrocarbon feed, preferably 1.8 to 2.5 parts water per 1 part by weight of hydrocarbon. The pressure in the reaction zone may be in the range of 1 to 100 atmospheres and is preferably in the range of 10 to 70 atmospheres. Sufficient pressure is used to reduce carbon formation and at the preferred pressure little carbon is formed over long periods of time.

If the catalyst has suitable activity and high activity maintenance it should be capable of effecting high conversion, e.g. 90 to 100%, of the hydrocarbons to gas at low reaction temperatures, e.g. 700° F., and continue over a long period to give high conversion without increasing the temperature or changing the space velocity of the steam and hydrocarbon feed. By having the reaction temperature sufficiently low and the pressure sufficiently high, the methane content of the gas produced is maintained at greater than 50% by volume on the water free gas basis. The concentration of methane and the gas product can be increased by removal of carbon dioxide as well as the water vapor. Steam can oxidize the catalyst and deactivate it as the temperature rises to above 900° F., and accordingly the life of the catalyst is prolonged by having it exposed to steam in the reaction zone at temperatures lower than 900° F. The deactivation which is caused by contact with steam may involve an oxidation and sintering of the nickel which in turn decreases the nickel surface area.

Details on preferred methods for preparing the catalyst, using the catalyst, and testing the catalyst in demonstration of the invention are given in the following examples:

Example 1.—Preparation of ceria promoted nickel-alumina catalysts 750 g. of $Ni(NO_3)_2 \cdot 6H_2O$ and 740 g. of $$Al(NO_3)_3 \cdot 9H_2O$$

were added to 3.0 liters of deionized water, stirred, and the solution brought to a boil. Then 1040 g. of $NH_4HCO_3$ was added while maintaining the slurry at a boil. After the coprecipitation was finished, the slurry was stirred and boiled an additional 2 hours. The slurry was then filtered but not washed. To the resultant precipitate was added 28.0 g. of cerous nitrate $Ce(NO_3)_3 \cdot 6H_2O$. The resultant catalyst was dried overnight at 350° F., and then calcined in air for 4 hours at 750° F.

Example 2

The cerium-promoted catalyst prepared in Example 1 was reduced with $H_2$ at 700° F. for 10 hours and then was given an activity test by reacting 5.6 lbs. of 95% hexane per hour per lb. of the catalyst at 700° F. under 500 p.s.i.g. with 2 lbs. of water vapor per lb. of hydrocarbon. The catalyst was analyzed to contain 47.3 wt. percent nickel as the metal, 2.8 wt. percent cerum, and had a total surface area of 170 m.²/g. The activity of the catalyst was then determined and expressed as standard cubic feet of gas product per hour per 250 cc. of hexane feed, produced after a certain number of hours of operation under the test conditions. The ceria promoted catalyst was determined to have an activity of 9.8 after 20 hours of operation and an activity of 7.0 after 50 hours of operation. Both of these activity values indicated that the ceria promoted nickel-alumina catalyst formed by the coprecipitation and treatment described in Example 1 is superior to the unpromoted nickel-alumina catalyst and superior to the various other nickel catalysts prepared by other methods. A detailed analysis of the product obtained during hours 40 to 50 on feed indicated that the catalyst converted 59.4% of the hydrocarbon feed producing a gas (on a dry, $CO_2$ and $C_2+$ free basis) containing 73.8 vol. percent $CH_4$, 25.2 vol. percent $H_2$ and 1.0 vol. percent CO which has a heating value (on the same basis as before) of 830 B.t.u./s.c.f.

Example 3.—Preparation of lanthanum promoted nickel-alumina catalysts 750 g. of $Ni(NO_3)_2 \cdot 6H_2O$ and 740 g. of $$Al(NO_3)_3 \cdot 9H_2O$$

were added to 3 liters of deionized water, stirred and the solution brought to 120° F., then 1040 g. of $NH_4HCO_3$ were added while stirring and maintaining the slurry at 120° F. After the coprecipitation was finished, the slurry was stirred an additional 2 hours while maintaining the temperature at 120° F. The slurry was then filtered but not washed. To the resultant precipitate was added 93.8 g. of $La(NO_3)_3 \cdot 6H_2O$ dissolved in a little distilled water. The resultant catalyst was dried overnight at 230° F. and then calcined in air for 4 hours at 750° F.

Example 4

The lanthanum promoted catalyst prepared as in Example 3 was prereduced with $H_2$ for 10 hours at 700° F. and then was given an activity test by feeding to a reactor 11.2 lbs. of 95% hexane per hour per lb. of the catalyst at 700° F. under 500 p.s.i.g. with 2 lbs. of water per lb. of hydrocarbon. The activity of the catalyst was determined and expressed as standard cubic feet of product gas per hour per 250 cc. of hexane feed, produced after a certain number of hours of operation under the test conditions. With this very high feed rate at hours 16 to 18 on feed, the lanthanum promoted catalyst was found to have a very high activity of 5.7 standard cubic feet per hour per 250 cc. of hexane feed.

This test showed that the lanthanum promoter was superior to the same type of catalyst promoted by potassium as to activity.

Example 5.—Preparation of mixed lanthanide rare earth (cerium/lanthanum) promoted nickel-alumina catalysts using commercially available mixed rare earths 750 g. of $Ni(NO_3)_2 \cdot 6H_2O$ and 740 g. of $$Al(NO_3)_3 \cdot 9H_2O$$

were added to 3 liters of deionized water, stirred, and the solution brought to 120° F. Then 1040 g. of $NH_4HCO_3$ were added while stirring and maintaining the slurry at 120° F. After the coprecipitation was finished, the slurry was stirred an additional 2 hours while maintaining the temperature at 120° F. The slurry was then filtered but not washed. To the resultant precipitate was added 61.6 g. of $Ce(NO_3)_3 \cdot 6H_2O$ and 31.2 g. of $La(NO_3)_3 \cdot 6H_2O$ dissolved in a little deionized water. The resultant catalyst was dried overnight at 230° F. and then calcined in air for 4 hours at 750° F.

Example 6

The mixed lanthanide rare earth-promoted catalyst prepared using typical commercially available mixed lanthanide rare earths in Example 5 was prereduced with $H_2$ for 10 hours at 700° F. and then was given an activity test by feeding to a reactor 11.2 lbs. of 95% hexane per hour per lb. of catalyst at 700° F. (temperature of the lead bath into which the reactor was immersed) under 500 p.s.i.g. with 2 lbs. of water per lb. of hydrocarbon. The activity of the catalyst was determined and expressed as standard cubic feet of product gas per hour per 250 cc. of hexane feed, produced after a certain number of hours of operation under the test conditions. At this very high feed rate, the catalyst during hours 32 to 34 on feed was found to have a high activity of 2.7 standard cubic feet of product gas per hour per 250 cc. of hexane feed.

The invention described is claimed as follows:

1. The catalyst composition prepared by a process comprising:
   (a) providing an aqueous solution of soluble nickel and aluminum compounds and coprecipitating insoluble nickel and aluminum compounds from the solution in proportions sufficient to form a precipitate containing 0.4 to 1.5 atoms of nickel per atom of aluminum;
   (b) mixing the precipitate with a lanthanide rare earth compound in proportions sufficient to produce a mixture containing 0.001 to 1.0 atom of lanthanide rare earth per atom of nickel;
   (c) drying the mixture; and
   (d) calcining the dried mixture at a temperature of from about 600° F. to about 925° F.

2. The catalyst composition of claim 1 wherein the lanthanide rare earth compound contains principally a member selected from the group consisting of lanthanum, cerium and mixtures thereof.

3. The catalyst composition of claim 2 wherein the lanthanide rare earth compound contains principally lanthanum.

References Cited

UNITED STATES PATENTS

| | | | |
|---|---|---|---|
| 2,094,117 | 9/1937 | Brykit | 252—466 |
| 2,119,565 | 6/1938 | Williams | 252—466 |
| 2,151,329 | 3/1939 | Page et al. | 252—466 |
| 2,337,191 | 12/1943 | Greensfelder et al. | 252—462 |
| 2,449,295 | 9/1948 | Gutzeit | 252—466 |
| 2,814,599 | 11/1957 | Lefrancois et al. | 252—466 |

FOREIGN PATENTS 820,257   9/1959   Great Britain.

DANIEL E. WYMAN, *Primary Examiner.*

C. F. DEES, *Assistant Examiner.*